April 1, 1952 S. McCANDLESS 2,591,661
REFLECTOR FOR CONTROLLING AT A PREDETERMINED ANGLE
DIRECT AND REFLECTED RAYS FROM A LIGHT SOURCE
Filed March 7, 1947 5 Sheets-Sheet 3

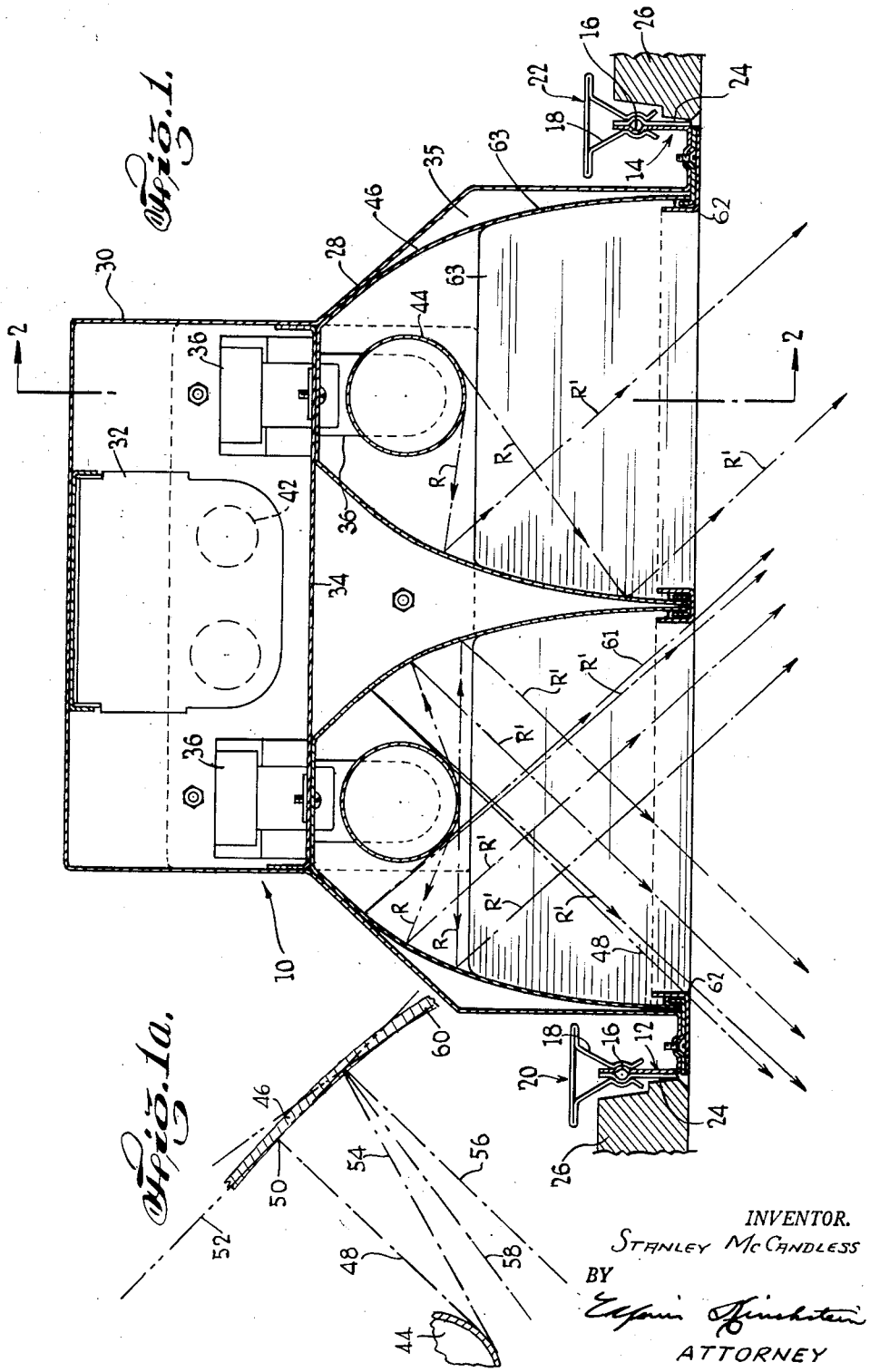

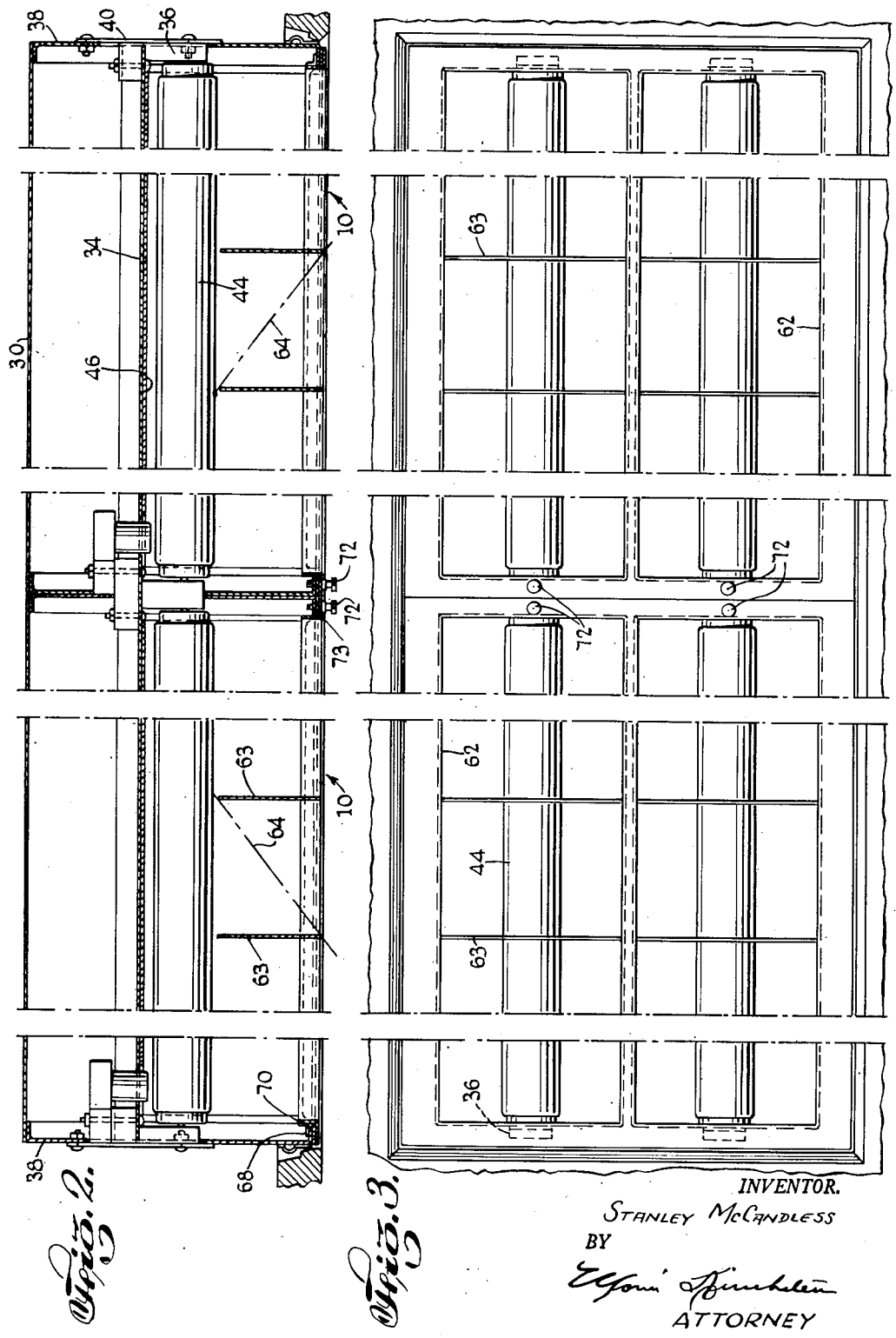

INVENTOR.
STANLEY McCANDLESS
BY
ATTORNEY

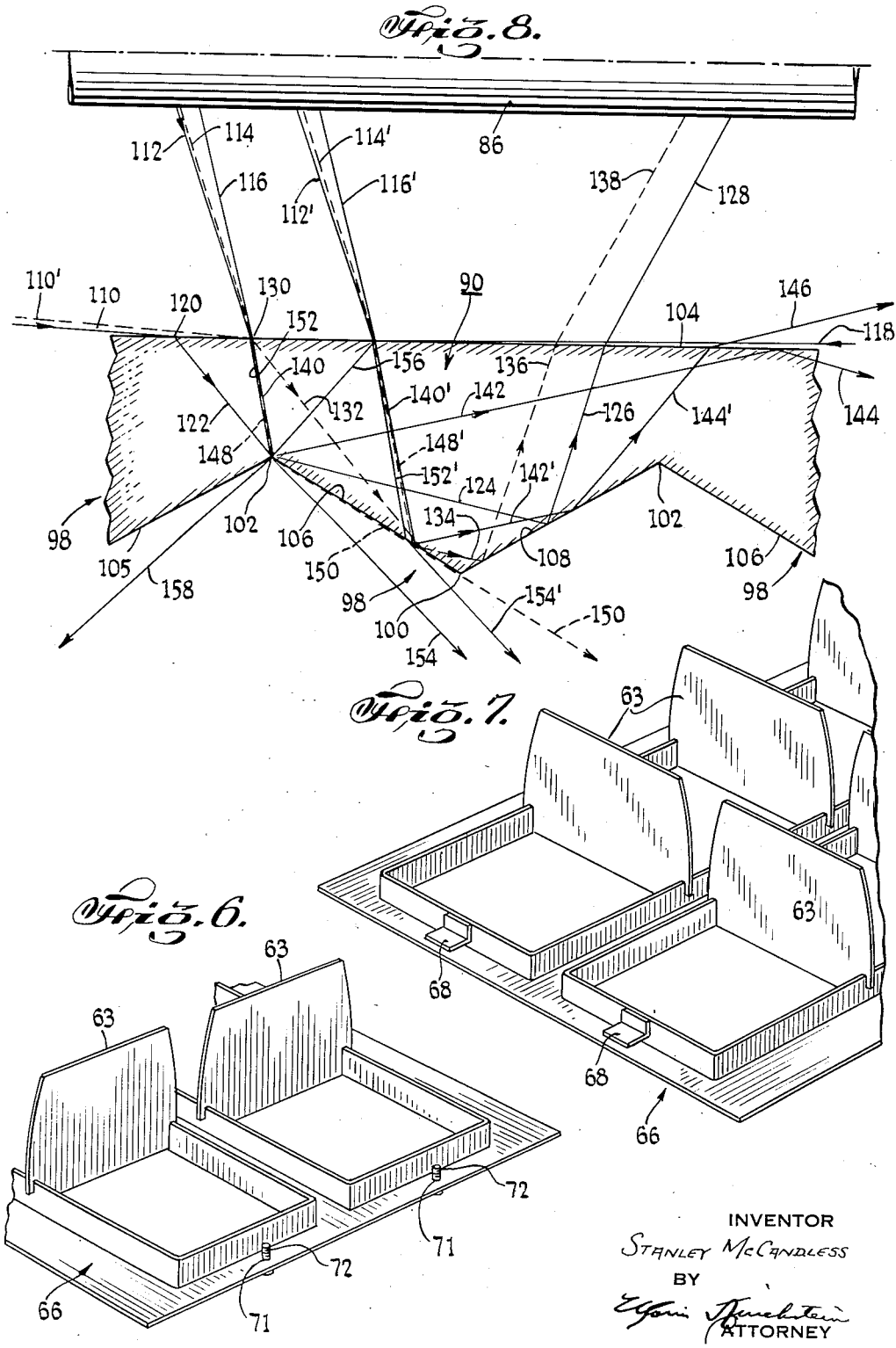

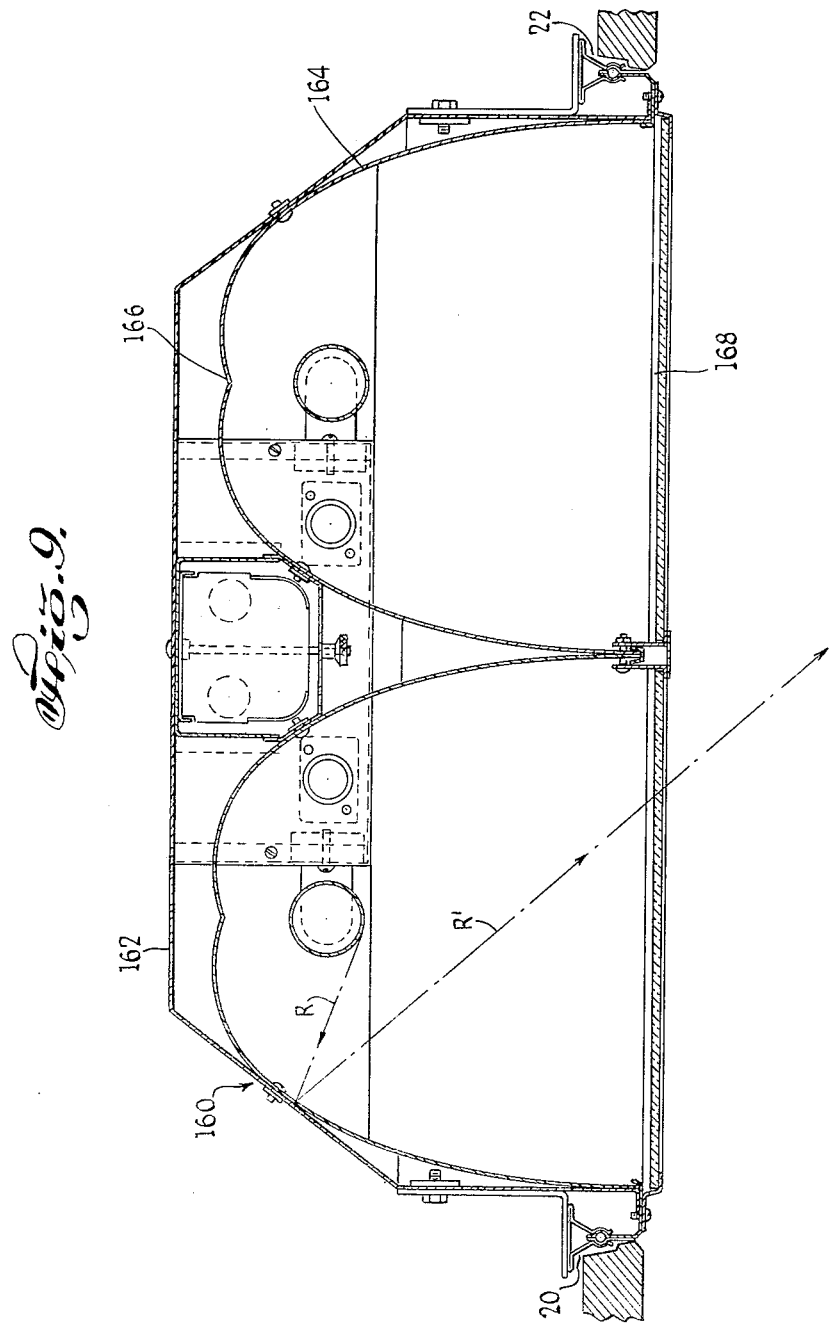

Patented Apr. 1, 1952

2,591,661

UNITED STATES PATENT OFFICE 2,591,661

REFLECTOR FOR CONTROLLING AT A PRE-DETERMINED ANGLE DIRECT AND REFLECTED RAYS FROM A LIGHT SOURCE

Stanley McCandless, Hamden, Conn., assignor to Century Lighting, Inc., New York, N. Y., a corporation of New York Application March 7, 1947, Serial No. 732,995

3 Claims. (Cl. 240—103)

This invention relates to lighting fixtures, and, more particularly, pertains to lighting fixtures of the type designed to employ a fluorescent tube as the source of light.

Fluorescent tubes and the typical fixtures heretofore associated therewith have been characterized by their high surface brightnesses which tended to distract attention and cause discomfort.

It is an object of my invention to provide a fluorescent fixture having a low surface brightness in the normal line of vision, thereby avoiding the foregoing drawbacks.

It is another object of my invention to provide a fixture of the character described in which light emanating from the fixture breadthwise of the tube is cut off within the normal range of vision.

It is a further object of my invention to provide a fixture of the character described in which light emanating from the fixture lengthwise of the tube also is cut off within the normal range of vision.

It is an additional object of my invention to provide a fixture of the character described in which light is evenly distributed in the working plane. More specifically I contemplate providing a fixture of the character described wherein light issuing from the fixture breadthwise of the tube is cut off at about a 45° angle to the vertical so that the light defines a 90° wedge, the distribution of the light within the wedge being such that a substantially even illumination is secured at the working plane over a width equal to about 85% of the distance from the tube to said plane.

It is yet another object of my invention to provide a fixture of the character described which is highly efficient in concentrating and directing light issuing from the tube, that is to say, highly efficient compared to present-day fixtures which cut off light breadthwise of a tube within the normal angle of vision, it being understood that fixtures which cut off light in this manner cannot reach the much higher efficiencies of fixtures which disseminate light over wider angles.

It is still another object of my invention to provide a fixture of the character described in which a specular reflector is employed for concentrating and directing light issuing from a fluorescent tube.

Other objects of my invention will in part be obvious and in part hereinafter pointed out.

The invention accordingly consists in the features of construction, combinations of elements and arrangements of parts which will be exemplified in the constructions hereinafter described and of which the scope of application will be indicated in the appended claims.

In the accompanying drawings, in which are shown various possible embodiments of my invention, Fig. 1 is a transverse sectional view through a fluorescent fixture constructed in accordance with my invention;

Fig. 1a is an enlarged view of a portion of the reflector of said fixture the same being illustrative of the method of laying out the reflector.

Fig. 2 is a longitudinal section view through said fixture, the same being taken substantially along the line 2—2 of Fig. 1;

Fig. 3 is a bottom plan view of said fixture;

Figs. 6 and 7 are detail perspective views of the ends of louvers employed to cut off light issuing lengthwise of a fixture;

Fig. 8 is an enlarged sectional view through a ribbed glass, alternatively used to cut off light issuing lengthwise of a fixture; and Fig. 9 is a view similar to Fig. 1 of a fluorescent fixture embodying another modified form of my invention.

Figure 5:
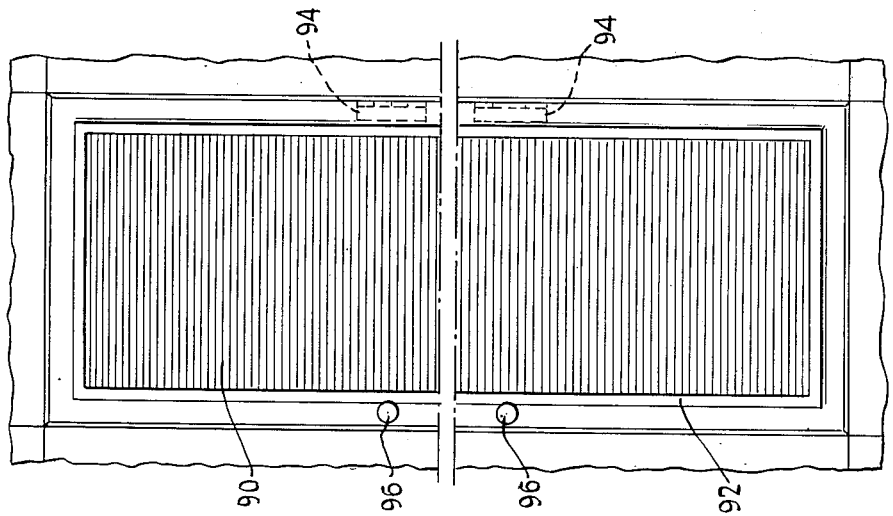
Figs. 4 and 5 are views, similar to Figs. 1 and 3, of a fixture embodying a modified form of my invention.

Referring now in detail to the drawings, and more particularly to Figs. 1, 2, 3, 6 and 7, the reference numeral 10 denotes a fluorescent fixture constructed in accordance with and embodying my invention. Said fixture, which, by way of illustration, is particularly designed to be set into an acoustical tile ceiling, includes a pair of spaced attaching members 12, 14 in the form of erect flanges each having an inwardly directed longitudinal rib 16. Said flanges are adapted to be snapped between pairs of grooved spring fingers 18 of conventional supporting members 20, 22 for an acoustical tile ceiling. These spring fingers also are adapted to receive and hold attaching ribbed members 24 extending from acoustical tiles 26. Thus, the fixture may be placed in a ceiling in a space provided by withdrawing one or more aligned tiles.

The fixture 10 comprises a housing 28 extending between and integral with the attaching members 12, 14. Said housing includes an elongated upper portion 30 of hollow rectangular cross-section in which are contained the electrical wiring and equipment conventionally employed in fluorescent fixtures, as, for example, a ballast 32. The bottom of said rectangular portion is closed by a plate 34 which, with the remainder of the housing, defines an enclosure 35 for the optical part of the fixture. Said plate supports two pairs of suitable fluorescent lamp sockets 36 in proper arrangement to hold a pair of fluorescent tubes located in such fashion that the longitudinal axes of the tubes are symmetrically positioned in the fixture, each optionally being spaced inwardly about one-quarter of the width of the fixture.

The open ends of the housing 28 are closed by sheet metal caps 38 having apertures therein which are detachably covered by plates 40. Said plates may be provided with knockout discs 42. Where two or more fixtures 10 are arranged in tandem, as illustrated in Figs. 2 and 3, the plates 40 are removed to permit the fixtures to be butted against one another end to end, only the covering plates 40 on the exposed ends of the endmost fixtures being left in place. This arrangement allows adjacent fixtures to be placed very close to one another so that there will only be a very narrow dark band between the fixtures.

The lamp sockets 36 support fluorescent tubes 44, the light from which is to be concentrated and directed pursuant to my invention. Inasmuch as the means employed for this purpose is duplicated with each tube, only one such means will be described in detail. Said means includes a specular reflector 46, that is to say a reflector having a mirror-like surface. The reflector is elongated and has its longitudinal axis parallel to the length of the tube, and, moreover, is symmetrical about a vertical plane extending through the tube. Said reflector is so generated or laid out that no light emanating from the tube breadthwise will be permitted to leave the fixture at substantially greater than a predetermined cut off angle to the vertical, e. g. 45°. Furthermore, the reflector design is such that the light is built up toward this cut off angle. This raises the intensity of light near the lateral edges of an illuminated area; and the increase in intensity of illumination compensates for the lessening angle of incidence, whereby the illumination of the working plane is maintained substantially uniform from side to side and does not lessen as it does with conventional fixtures.

Figure 4:
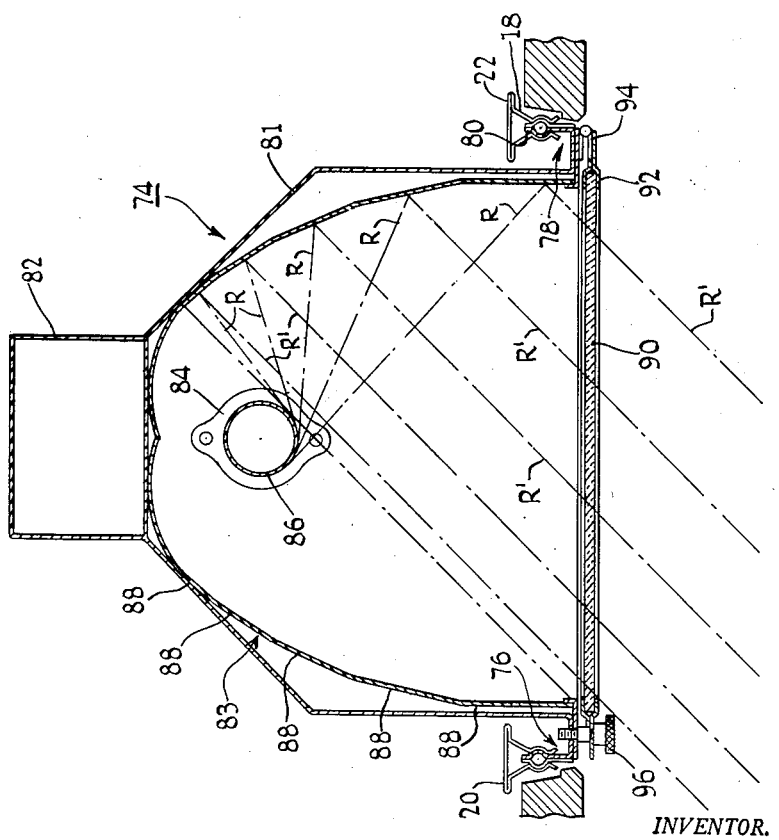

The foregoing results are secured by providing a reflector so shaped that all of its reflecting elements below the cut off planes are parallel to the longitudinal axis of the tube and are so oriented or positioned that any breadthwise light ray R emanating from the tube and tangential to the envelope thereof will, upon striking a given element, be reflected at substantially the predetermined angle of cut off, as indicated at R', this angle in the instant embodiment of my invention being 45°. The term "breadthwise ray" as read herein denotes a ray such as the ray R which is perpendicular to the longitudinal axis of the tube. The aforesaid elements may be infinitesimally narrow, in which case the reflector will be a curved surface as shown. However, it is within the spirit of my invention to employ elements of a finite width, in which event the reflector will comprise several flat panels on each side of the tube, as illustrated in Fig. 4. In such latter case each said element preferably is so oriented that approximately the center thereof will function in the manner above described, that is, will reflect an incident tangentially emitted ray at the cut off angle. This will allow a slight spread of the reflected tangential rays but will, to all intents and purposes, function satisfactorily in accordance with my invention.

The configuration of the surface of the specular reflector may be derived as follows: A breadthwise line 48, (see Fig. 1a) inclined at the selected 45° cut off angle, is drawn tangential to the envelope of the fluorescent tube. Through an arbitrary point 50 in said line, above the tube, a line 52 is drawn perpendicular to the line 48. Another line 54 is laid out tangential to the envelope of the tube but at a lesser inclination. The line 52 is extended to intersect the line 54 and through the point of intersection a line 56 is scribed parallel to line 48. The bisector 58 for the angle between lines 54, 56 is laid out, and a line 60 drawn perpendicular to the bisector and through the point of intersection. This process is repeated at regular small angular intervals on both sides of the tube until the opposite cut off line 61 or 48 is reached, thus providing a series of intersecting perpendiculars such as the lines 52, 60. If the reflector is to consist of a series of flat specular elements, these perpendiculars 52, 60 etc. will represent the finished transverse contour of the reflector. If a continuously curved reflector, such as one shown, is to be formed, a smooth curve is drawn tangential to the perpendiculars 52, 60 etc.

With this arrangement, all tangential beams emitted from the envelope of the tube will be reflected onto the working plane at the same predetermined angle, thus tending to build up illumination towards the lateral remote edges of the illuminated area. Obviously all other beams which strike the specially formed reflector will be reflected at steeper angles so that all reflected light will be sharply cut off at the predetermined angle. Moreover, these other reflected beams also will in general be directed toward the sides of the illuminated plane whereby to enhance the build up to both sides of said plane.

Where the tube diameter to reflector opening ratio is relatively large, say one-quarter, the foregoing construction brings the reflector very close to the tube at the cut-off angle. Accordingly I may slightly increase the angle of the reflected beams to the vertical at the portion of the reflector near the cut-off angle. This will be seen upon careful measurement of Fig. 1.

The bottom edges 62 of the reflector act as blocking or physical cut offs and for this purpose terminate at the cut off lines 48, 61 tangential to the envelope of the tube. Thus, the reflector serves to provide both a reflective and a direct cut off; reflective in the sense that the reflected rays do not exceed the predetermined cut off angle, and direct in that all rays emanating from the tube and directed downwardly at an angle less than 45° to the horizontal will be reflected.

All tangential rays above the cut off lines 48, 61 are either permitted to escape through the top of the fixture, are reflected downwardly, or are reflected from one to the other side of the reflector and then downwardly, the reflector not being designed to direct these rays out at the cut off angle. If desired, however, the portion of the reflector above the cut off lines may be cylindrical with the center of revolution at the center of the tube, to redirect rays above the cut off angle back around the source of light generally.

It may be mentioned that, if the reflector, as initially designed, is too wide at its lower end, the generation thereof is again performed in the manner already described, but starting at a point 50 closer to the tube.

The reflector is secured to the plate 34 in any suitable manner, as for example, by welding, or by nuts and bolts or snaps.

A fixture incorporating a specular reflector such as just described is characterized by an abrupt breadthwise cut off so that a person approaching a fixture from the side and deliberately looking at the fixture will suddenly see a bright beam of light when he reaches the angle of cut off. Immediately prior to reaching this angle the reflector will have a shiny gray appearance and illumination thereof will be approximately equal in intensity to that of an ordinary ceiling when illuminated to a low intensity.

Lengthwise cut off may be secured by employing a series of parallel vertical plane louvers 63 beneath and perpendicular to the longitudinal axis of the tube, and spaced apart along the length thereof a proper distance to secure the desired angle of cut off. Thus in the illustrated example the spacing between the louvers is such that the angle of lengthwise cut off is about 50° from the vertical, being indicated by the lines 64.

The louvers are secured to a hollow rectangular frame 66 (Figs. 6 and 7) which is attached to the housing 28. Said attachment preferably is demountable to permit ready access to the inside of the fixture for replacement of the tubes or starter. To this end, the frame 66 includes a pair of angle brackets 68 at one end which are adapted to rest upon an inturned flange 70, extending from the lower edge of the cap 38 at the corresponding end of the fixture. The opposite end of the frame 66 has a pair of holes 71 designed to pass thumb screws 72 which engage tapped apertures in an inturned flange 73 extending from the lower edge of the cap at the opposite end of the fixture.

The surface of the louvers is non-reflective, the same optionally being provided with a matte finish either by anodizing, or by a dull paint, e. g. a flat gray paint, having for example, about a 10% coefficient of reflection.

In Figs. 4, 5 and 8 I have shown a fixture 74 embodying a modified form of my invention. This fixture is similar to the fixture 10 first described insofar as both fixtures employ specular reflectors having a direct and reflected cut off at a predetermined angle. The fixture 74 differs from the fixture 10 in that another type of means is used to secure the desired lengthwise cut off. The fixture 74 also differs from the fixture 10 in certain commercial respects, as for example by including only a single tube instead of the two tubes of the fixture 10. However, both said fixtures 10 and 74 are of the troffer type being adapted to be set into the space occupied by a single line of acoustical tiles and to extend over as long a distance as is deemed desirable.

Said fixture 74 includes attaching members 76, 78 with longitudinal ribs 80 adapted to be snapped between the spring fingers 18 of the acoustical tile supports 20, 22. The housing 81 of the fluorescent fixture 74 comprises a portion 82 for housing the ballast (not shown) and from whose bottom end the specular reflector 83 depends. The fixture also includes a pair of longitudinally spaced lamp sockets 84 which support and supply the power to a fluorescent tube 86.

The reflector is so designed that all longitudinal elements thereof below cut off lines tangential to the envelope of the fluorescent tube will reflect all tangentially emanated rays at the cut off angle and so that the bottom edges of the reflector will intercept direct rays at the cut off angle. Said reflector comprises several, e. g. five, flat panels 88 properly oriented to achieve the foregoing uniform reflective cut off.

The lengthwise cut off means comprises a pane 90 of glass supported in a frame 92 attached by hinges 94 to the fixture housing. The side of the frame opposite from the hinges is detachably held to the housing by thumb screws 96.

Said pane of glass is ribbed transversely of the longitudinal axis of the fluorescent tube whereby to form the under surface of the glass into a series of elongated adjacent wedges or prisms 98 (Fig. 8) extending at right angles to said axis, with the apices 100 of the wedges pointing downwardly and the valleys 102 between the wedges pointing upwardly. The prisms shown herein have a peak angle of substantially 120°. Both the valleys and the apices are made as acute as economically feasible, inasmuch as the presence of rounded surfaces at these points reduces the sharpness of the lengthwise cut off achieved by the ribbed glass. However, a curvature extending over a short distance at the apices or valleys does not appreciably affect such cut off.

The manner in which the ribbed glass functions to achieve lengthwise cut off will be appreciated from examination of Fig. 8. In this figure I have shown the path of several light rays incident at various critical angles upon the upper surface 104 of the pane 90 and impinging on the sloped side 106 of a wedge. These rays all issue from the straight fluorescent tube 86 and only the lengthwise components of the rays are considered, the breadthwise components of said rays being concentrated and directed by the specular reflector 83.

For convenience, the incident rays will be taken up in clockwise order starting with the ray 110, which passes from left to right and is almost parallel with the upper surface 104 of the pane, and considering in turn the rays 110′, 112, 112′, 114, 114′, 116, 116′, and 118. By way of example, the pane 90 will be assumed to be made of glass having an index of refraction of 1.52, and whose faces 108, 106 are inclined at an angle of 30° to the horizontal.

The ray 110 strikes the glass 90 at a point 120 and passes through the glass along a path 122 until it meets the surface 106 where it is internally reflected along a path 124. The reflected ray then strikes the surface 108 and is again internally reflected this time along a path 126. Said ray thus is directed back up to the surface 104 emerging along the path 128.

The ray 110′ impinges on the glass at a point 130 and is internally reflected along the path indicated by the lines 132, 134, 136, and 138. The rays 112, 112′, also are internally reflected traveling along the respective paths indicated by the lines 140, 142, 144, etc., and 140′, 142′, 144′ and 146.

It will be apparent that all rays within the angle defined by the rays 110 and 112—112′ will be internally reflected with respect to the side 106 and will not leave the under surface of the pane of glass.

The rays 114, 114′ are slightly steeper than the rays 112, 112′, this slight additional steepness being sufficient to permit said rays to emerge from the under surface of the glass pane. The path of travel of said rays is indicated by the lines 148, 150 and 148′, 150′, respectively.

Light rays steeper than the rays 114—114′ emerge from the under surface of the pane at a steeper angle. Consider, for example, the rays 116, 116′. These pass through the glass along paths 152 and 152', respectively, emerging along the lines 154, 154'. Rays occupying all angular positions from the ray 114—114' to the ray 118 will emerge from the under surface of the pane, the path of travel for the ray 118 being indicated by the lines 156, 158.

The emergent rays which impinge upon the surface 106 will, therefore, define a wedge between the lines 150 and 158. It can be shown that the emergent rays impinging upon the surface 108 will define a similar wedge one side of which is said face 108 and the other side of which is a line symmetrical with the line 158 but near the face 106. Therefore, no matter what the angle at which a ray of light is incident upon the upper surface 14 of the pane of ribbed glass, all emergent rays will issue at angles no flatter than the faces 108, 106, so that the ribbed glass acts as a lengthwise cut off, in this case 60° to the vertical. If a steeper cut off is desired, the prisms may be made sharper.

In Fig. 9 I have shown another fixture 160 wherein my invention is embodied in a coffer, i. e., a wide type of fixture which commonly is not placed end to end as are the troffers hereinbefore described. The fixture 160 includes a suitable housing 162 detachably secured to the acoustical tile supports 20, 22. The specular reflectors 164 for this fixture are of the continuously curved type, i. e., generally the same as the reflectors 46, but are shaped differently at the top. This part of the reflector is provided with a cusp directly above the fluorescent tube. Said reflector provides breadthwise cut off, lengthwise cut off being taken care of by panes of glass 168 which are transversely ribbed as described with respect to Fig. 8.

It will thus be seen that I have provided lighting fixtures which achieve the several objects of this invention and are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. An electric lighting fixture comprising a socket for holding a fluorescent tube having a diffuse cylindrical envelope, and an elongated specular reflector within which the tube in said socket is located, said reflector being symmetrical with respect to a plane passing through the longitudinal axis of said tube, said reflector being so shaped and located with respect to said envelope that all breadthwise light rays emanating tangential to the tube envelope within approximately a predetermined angle of cut off and incident upon the reflector will be reflected at the cut off angle, the shape of said reflector in a plane perpendicular to the longitudinal axis of said tube being that of a smooth curve tangent to small contiguous straight lines of progressively varying different angularity from which breadthwise light rays issuing tangentially to the envelope of the tube within approximately the cut off angle are reflected substantially parallel to said angle, said reflector including a portion on each side of the plane of symmetry, each said portion having an upper boundary lying in a plane which is tangent to the tube envelope at a line on the envelope located on the same side of the plane of symmetry as said portion, said tangent plane extending upwardly from the envelope to the upper boundary of said portion, the small straight line at the upper boundary of each portion being disposed perpendicular to the tangent plane extending upwardly from the tube envelope to said upper boundary.

2. An electric lighting fixture comprising a socket for holding a fluorescent tube having a diffuse cylindrical envelope, and an elongated specular reflector within which the tube in said socket is located, said reflector being symmetrical with respect to a plane passing through the longitudinal axis of said tube, said reflector being so shaped and located with respect to said envelope that all breadthwise light rays emanating tangential to the tube envelope within approximately a predetermined angle of cut off and incident upon the reflector will be reflected at the cut off angle, the open side of the reflector through which useful light is emitted terminating at the cut off angle so as to block direct rays of light above said angle, the shape of said reflector in a plane perpendicular to the longitudinal axis of said tube being that of a smooth curve tangent to small contiguous straight lines of progressively varying different angularity from which breadthwise light rays issuing tangentially to the envelope of the tube within approximately the cut off angle are reflected substantially parallel to said angle, said reflector including a portion on each side of the plane of symmetry, each said portion having a lower edge and an upper boundary, the lower edge of each portion lying in a plane which is tangent to the tube envelope at a line on the envelope located on the side of the plane of symmetry opposite from said portion, said tangent plane extending downwardly from the envelope to the lower edge of said portion, the upper boundary of each portion lying in a plane which is tangent to the tube envelope at a line on the envelope located on the same side of the plane of symmetry as said portion, said second tangent plane extending upwardly from the envelope to the upper boundary of said portion, the small straight line at the upper boundary of each portion being disposed perpendicular to the tangent plane extending upwardly from the lamp tube to said upper boundary.

3. An electric lighting fixture comprising a socket for holding an electric lamp having a diffuse envelope, said envelope having a cross-section symmetrical about an axis thereof, and a specular reflector within which the lamp envelope is arranged to be disposed, a cross-section of said reflector being symmetrical with respect to said axis, said reflector being so shaped and located with respect to said lamp envelope that all light rays emanating tangentially to said envelope within approximately a predetermined angle of cut-off and incident upon the reflector will be reflected at substantially the cut-off angle, the shape of said reflector cross-section being that of a smooth curve tangent to small contiguous straight lines of progressively varying angularity from which light rays issuing tangentially to said envelope cross-section within approximately the cut-off angle are reflected substantially parallel to said angle, the shape of said reflector cross-section including a portion on each side of said axis, each said portion having an upper boundary in a line which is tangent to said envelope cross-section at a point on the envelope located on the same side of said axis as said portion, said tangent line extending upwardly from said envelope cross-section to the upper boundary of said portion, the small straight line at the upper boundary of each portion being disposed perpendicular to the tangent lines extending upwardly from said envelope cross-section to said upper boundary.

STANLEY McCANDLESS.

REFERENCES CITED

The following references are of record in the file of this patent:

UNITED STATES PATENTS

| Number | Name | Date |
|---|---|---|
| 1,900,551 | Guth | Mar. 7, 1933 |
| 2,032,622 | Guillou | Mar. 3, 1936 |
| 2,223,841 | Biller | Dec. 3, 1940 |
| 2,232,499 | Waterbury | Feb. 18, 1941 |
| 2,291,494 | Lorenz | July 28, 1942 |
| 2,323,073 | Netting | June 29, 1943 |
| 2,337,437 | Allen | Dec. 21, 1943 |
| 2,368,810 | Donnelly | Feb. 6, 1945 |
| 2,434,049 | Nordquist | Jan. 6, 1948 |
| 2,526,074 | Guth | Oct. 17, 1950 |

FOREIGN PATENTS

| Number | Country | Date |
|---|---|---|
| 683,275 | Germany | Nov. 2, 1939 |